Patented Oct. 14, 1924.

1,511,323

UNITED STATES PATENT OFFICE.

EDWIN C. ECKEL, OF WASHINGTON, DISTRICT OF COLUMBIA.

PROCESS OF MAKING CEMENT AND BY-PRODUCTS.

No Drawing. Application filed January 14, 1924. Serial No. 686,229.

*To all whom it may concern:*

Be it known, that I, EDWIN C. ECKEL, a citizen of the United States, residing at Washington, in the District of Columbia, have invented certain new and useful Improvements in Processes of Making Cement and By-Products, of which the following is a specification.

This invention relates to a process of making cement and by-products, especially that type of cements having quick-hardening and chemically resistant properties.

The object of the invention is to provide a process for the advantageous production of such cements, in connection with metallic iron as a by-product; or, vice versa, in the production of metallic iron and a slag technically valuable as a cement compound. The present process has advantages resulting from the comparative cheapness of its constituents, as well as a freedom from excessive amounts of silica, which is detrimental to alumina cements.

The process embodies the use of titaniferous iron ore as a constituent. It is well known that in various parts of the world extensive deposits of iron ore exist, too high in titanic oxide to be economically treated under known metallurgical practice. Such ores carry from ten to forty per cent of titanic oxide, and are at present useless, since the fuel consumption required in their smelting is too high per ton of metallic iron produced. These titanic ores are characteristically very low in sulphur and phosphorus so that there is a direct incentive to their utilization provided a profitable method can be provided. The present invention embodies such a method, resulting in the production of a cement slag of the type referred to as well as in metallic iron of great purity.

The process employed consists typically in charging a mixture of limestone and titaniferous iron ore into a furnace, preferably one equipped with a hot blast, but optionally an electric or other type. The mixture is preferably in such proportions of limestone and the ore, depending on the composition of the latter, as to yield a fusible slag carrying 25 to 50% lime. The temperature is then raised, in a blast furnace by using coke, oil or gas as fuel; at from 1400 to 1500 degrees centigrade fusion of the charge takes place. The iron oxide in excess of what is needed in the cement is reduced and separates out as metallic iron in the lower part of the furnace, from which it is tapped as in ordinary blast-furnace practice. The other constituents—all of the lime and titanic oxide, any alumina that may be present, and between 2 and 10% of the iron oxide—form a fusible slag. This slag is withdrawn, either continuously or intermittently; it is then cooled; and it is then ground to a fine powder—which is the new titan cement claimed in this application.

There are certain details which may be noted here, for the sake of making the description so clear and definite that it may be readily followed and put into practice. For example, the titanic ore-limestone mixture does not normally require briquetting or special treatment, as is necessarily the case with a bauxite-limestone mixture used in the alumina cement manufacture. In running a normal blast furnace, the raw materials are preferentially mixed together, and the coke fed in separate layers. The whole operation, in a blast furnace, is essentially continuous. The coke consumption, with a good furnace, ranges around 25% of the charge as a maximum; it can be greatly reduced by careful attention to the blast and to tapping.

The metallic iron which separates in the furnace is always low sulphur and normally strict low-phosphorus; it has a value per ton far greater than the cement. With ordinary mixes, however, there will be produced from 1½ to 3 times as much cement-slag as metallic iron.

A small portion of the reduced metallic iron is apt to be caught in the form of globules, in the slag. This is particularly the case in a cool furnace, or when the mix is badly adjusted so as to give insufficient fluidity to the slag. In any case this trapped portion rarely amounts to over 3 to 5% of the total iron; it is often convenient, tho not strictly necessary, to separate it magnetically from the slag after preliminary grinding, but before sending the cement slag to finer grinders; this is done merely to save wear on the grinding machinery, and not because the presence of the reduced iron globules would have any bad effect on the quality of the cement.

The cooling of the slag exerts a very pronounced influence on its technical properties; with ordinary mixtures, either rapid granulation or extremely slow air-cooling seem to lower the strength and affect the setting time sharply; the preferable method, with an ordinary mixture, seems to be cooling by sprinkling as the slag issues from the tap.

Technically, the titan cements possess valuable properties. If the lime be kept below 50%, and with most mixes preferably around 30 to 40%, the cement hardens, after a normal set, with extreme rapidity and attains very high strengths in 24 to 48 hours. The gain in strength at later periods is at a lower rate, but the strength is at all periods far above that of Portland cements. An interesting point of difference between the titan and prior alumina cements lies in their specific gravity and density; a normally burned titan cement will give a gravity of 3.35 to 3.55, with resultant advantages in securing density of the concrete in which it will be used. The resistance to chemical attack is also higher than that of either Portland or alumina cements.

The strength of titan cements may be varied at will thru control of the lime-acid ratio; their setting time seems to be determined by method of cooling and by percentage of iron oxide retained in combined form. The product consists essentially of calcium titanate ($Ti O_2 Ca O$) with subordinate amounts of ferrites, aluminates, and silicate of lime.

In all the preceding description, the term lime is expressly understood to include whatever lesser amount of magnesia may be present (thru use of a magnesian limestone or an ore with magnesian gangue). In like manner the term titanic oxide is understood to include whatever lesser amount of alumina may be present. As a matter of fact, both magnesia and alumina will commonly be kept low in normal commercial practice. High magnesia is apt to give a stickly non-fluid slag; and alumina, except as brought in incidentally by the iron ores used, would not be an economic addition.

I claim:

1. A cement made from a mixture of titaniferous iron ore and a calcareous material.

2. A cement made from a mixture containing titanium, iron and calcareous material.

3. A cement material containing calcareous material, titanic oxide, iron oxide and alumina.

4. The process of making cement, comprising fusing a mixture of lime or limestone and titaniferous iron ore and grinding the resulting slag.

5. The process of making cement, comprising fusing a mixture of limestone and titaniferous iron ore, cooling the resulting slag by slight sprinkling, and grinding the same.

6. The process of making cement and iron, comprising fusing a mixture of lime and titaniferous iron ore in a furnace, tapping off the resulting iron, and cooling and grinding the remaining cement slag.

7. The process of making cement and iron, comprising fusing a mixture of titaniferous material and calcareous material in a furnace, separating the resulting metallic iron and slag, and cooling and grinding the slag.

8. A cement containing between 25 and 45% of lime, less than 20% of silica and iron oxide together, and from 10 to 60% of titanic oxide.

In testimony whereof, I affix my signature.

EDWIN C. ECKEL.